July 5, 1938. L. G. DAPERO ET AL 2,122,559
SPRAY GUN
Filed Oct. 29, 1937 3 Sheets-Sheet 2
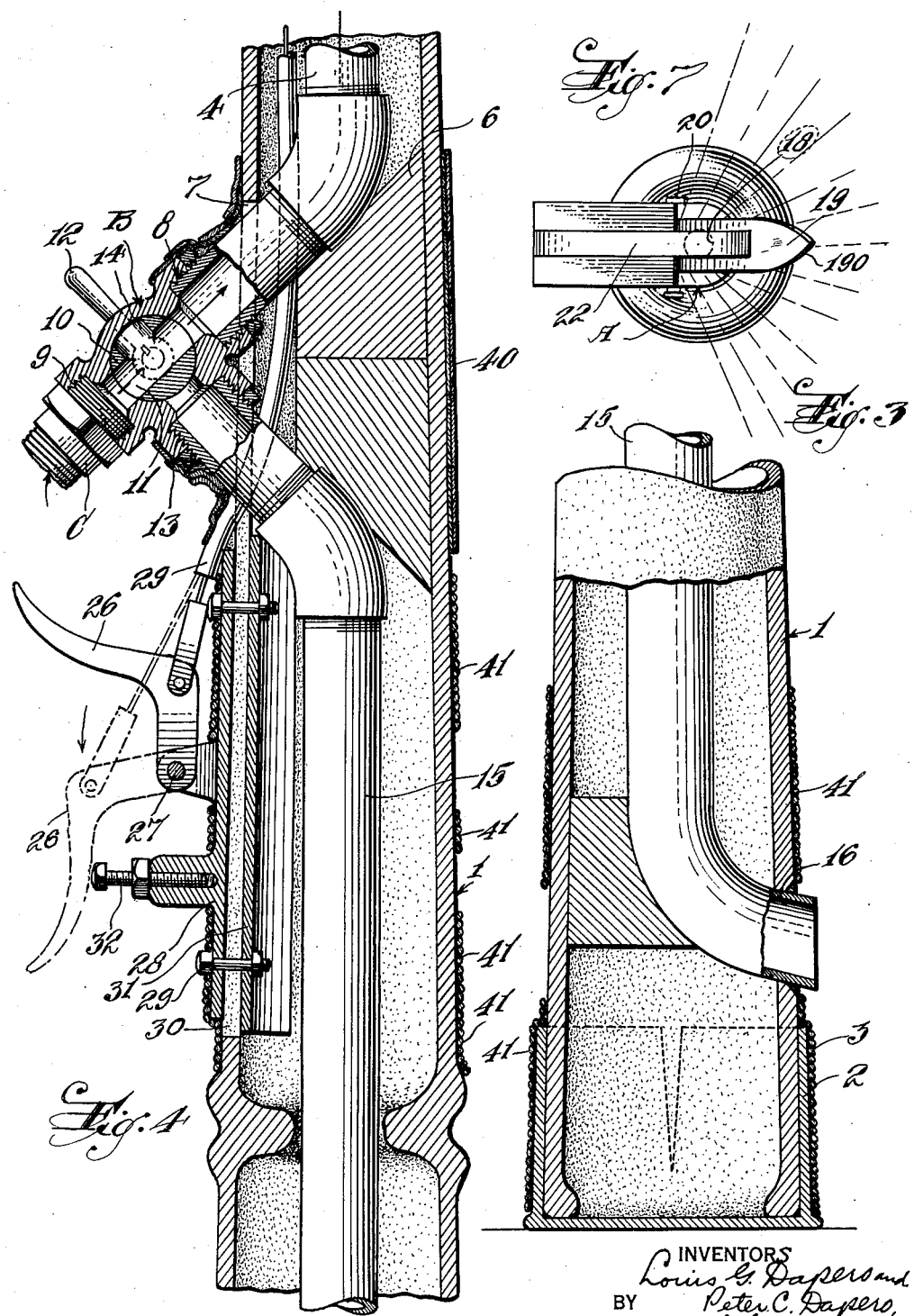
INVENTORS
Louis G. Dapero and
Peter C. Dapero,
BY
Harry B. Rook,
ATTORNEY July 5, 1938.　　　L. G. DAPERO ET AL　　　2,122,559
SPRAY GUN
Filed Oct. 29, 1937　　　3 Sheets-Sheet 3
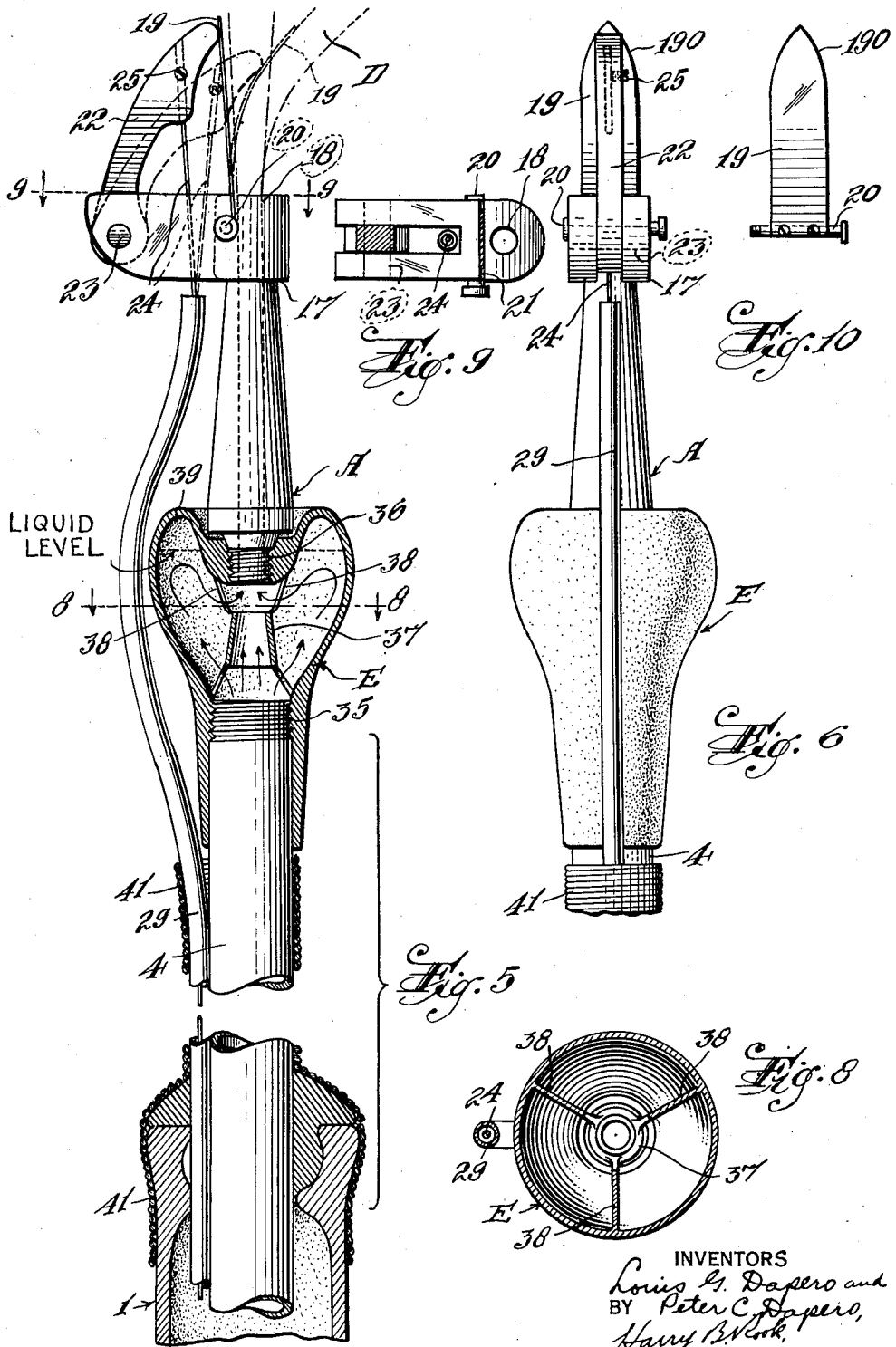

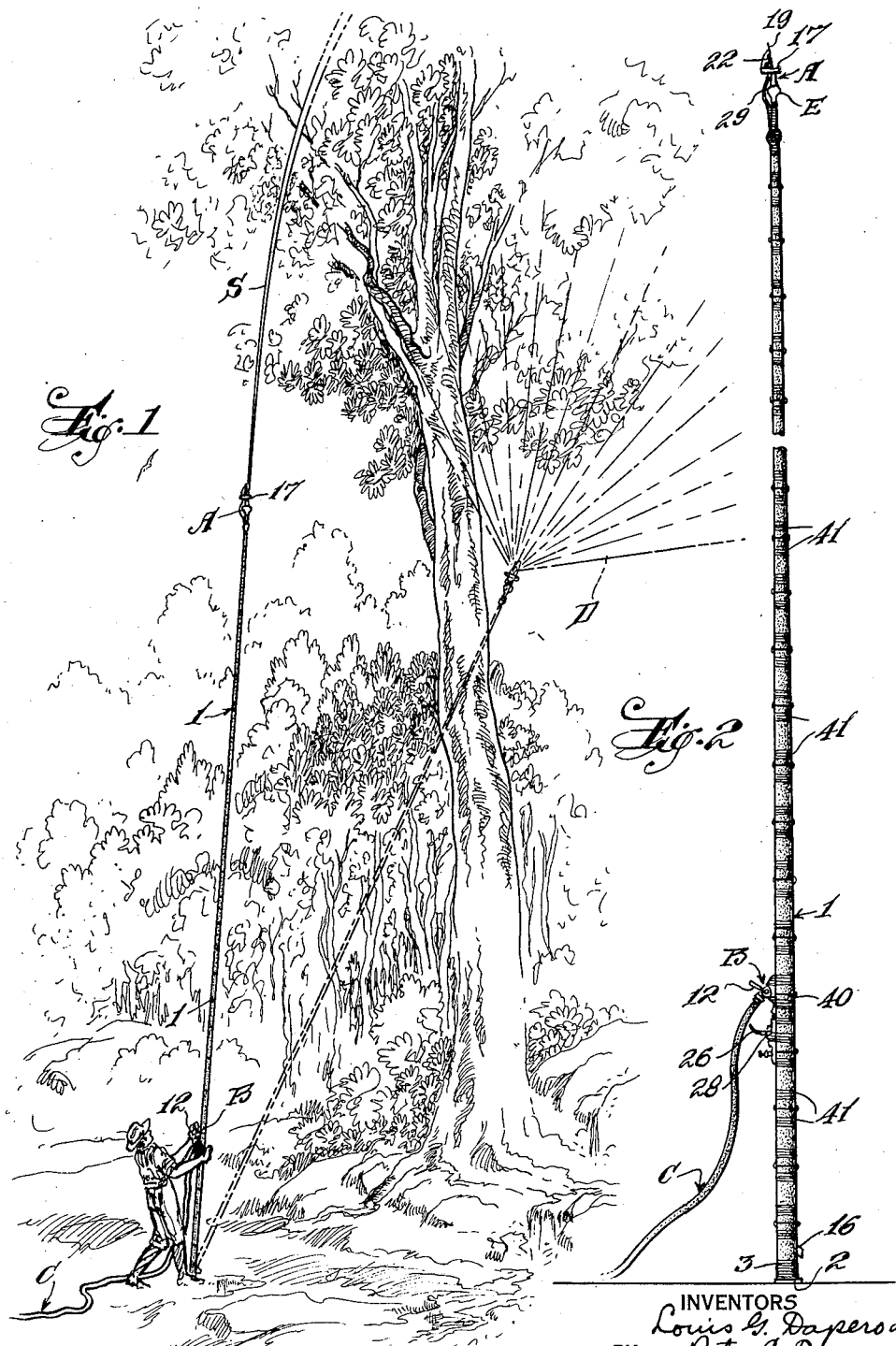

Patented July 5, 1938

2,122,559

UNITED STATES PATENT OFFICE 2,122,559

SPRAY GUN

Louis G. Dapero and Peter C. Dapero, Summit, N. J.

Application October 29, 1937, Serial No. 171,628

7 Claims. (Cl. 299—111)

This invention relates in general to spray guns and in particular to spray guns especially adapted for use in spraying trees without the necessity for climbing of the trees or the use of ladders.

Tree spraying apparatus usually includes a tank for the spraying liquid, a spray nozzle, and a pump for forcing the liquid through a hose to the spray nozzle. The spray nozzle is usually mounted on a short piece of pipe by which the nozzle is handled. In spraying tall trees, for example seventy-five or eighty feet high, in order to reach the tree tops it is necessary for the operator to climb a ladder or the tree dragging the hose behind him, because the pump and nozzle cannot project the stream of spraying liquid from the ground to the tops of such tall trees. This practice requires the transportation and erecting of ladders, laborious effort by the operator and is dangerous. Moreover, generally two or more operators are required to do a spraying job.

Efforts have been made to overcome these difficulties by the use of improved high pressure pumps, but such pumps are expensive both in original cost and in operation, and moreover the high pressures used increase the danger of operation and require heavier apparatus. Furthermore with such apparatus, high pressure necessary to project the liquid to the tops of tall trees is objectionable and unnecessary in spraying the lower portions of the trees.

Prime objects of our invention are to provide a spray gun which shall embody novel and improved features of construction whereby a stream of spraying liquid can be projected to the tops of tall trees with a low pressure pump and with the operator standing on the ground; and to provide such a spray gun so constructed that it shall be light in weight, can be set upon the ground or other support during operation and can be handled and operated by one man without the necessity for ladders or climbing of trees.

Our invention contemplates a long tube or pipe, for example a tube of a length of the order of twenty-five feet, having a spraying head or nozzle at one end and a valved fitting adjacent its other end to be connected to a liquid supply hose. The tube or pipe is preferably thin-walled so as to be light in weight and inexpensive, and both for reenforcing the tube against bending and to support it at one end on the ground or other support, we mount the tube within a protective and supporting casing, for example a length of bamboo pole, whereby during spraying operations the pole may be held vertically by the operator with one end of the pole resting upon the ground and the nozzle disposed for example twenty-five feet above the ground.

Another object is to provide in a spray gun of this character a novel and improved combination and arrangement of the tube, valve, and pole whereby the valve can be conveniently operated by the operator on the ground while the pole is vertically disposed, and selectively the valve can be regulated to connect the tube to the liquid supply during spraying and to quickly drain the liquid from the tube after the spraying operation, both to reduce the weight of the spray gun for handling and to remove the liquid for storing of the spray gun.

Further objects of the invention are to provide a spray gun of this character which shall have a novel and improved nozzle adapted for selectively projecting the liquid in the form of a stream or a diffused or fan-shaped spray; and to provide in such a spray gun novel and improved means for operating the nozzle at the will of the operator, for example to project a stream of liquid to high points in a tree and thereafter in a continuous operation spray the lower portions of the tree with the fan-shaped spray.

Other objects are to provide a novel and improved spraying nozzle which shall include novel and improved means operable at the will of the operator for varying the size or spread of the fan-shaped spray; and to provide such a nozzle whereby there shall be a minimum of obstruction to flow of the liquid and a smooth, uniform flow free from spurting shall be ensured.

A further object is to provide in a spray gun novel and improved means adjacent the nozzle for accelerating the flow of liquid, and for preventing surging, spurting, or pulsation of the liquid stream, so as to ensure a rapid, smooth and uniform supply of liquid to the nozzle.

Other objects, results and advantages of the invention will appear from the following description when read in conjunction with the accompanying drawings.

Referring to the accompanying drawings,

Figure 1 is a side elevation of a spray gun embodying our invention showing the manner of using the gun.

Figure 2 is a side elevation of the gun on an enlarged scale.

Figure 3 is a fragmentary vertical longitudinal sectional view through the lower portion or butt end of the spray gun, on a further enlarged scale.

Figure 4 is a fragmentary vertical longitudinal sectional view through an intermediate portion of the spray gun.

Figure 5 is a similar view with portions shown in side elevation illustrating the upper end of the spray gun.

Figure 6 is a fragmentary side elevation of the spray head viewing the same from an angle at 90° to that of Figure 5.

Figure 7 is a top plan view of the spray head, showing the deflector in operation.

Figure 8 is a horizontal sectional view on the line 8—8 of Figure 5.

Figure 9 is a similar view on the line 9—9 of Figure 5, and

Figure 10 is a detached front elevation of the spray diffusing strip.

Specifically describing the illustrated embodiment of the invention, the reference character 1 designates a long hollow casing, preferably of a length of the order of twenty-five feet, although the length of the casing may be varied to suit different conditions. The casing may be formed of any suitable material but preferably comprises a one-piece bamboo pole because bamboo is inexpensive, light in weight and strong. One end of the pole has a boot or butt which is shown as comprising a metal cap 2 telescopically fitted over the end of the pole and preferably wrapped with wire, cord or other suitable material 3 to reenforce the end of the pole.

Within the pole is supported a tube or pipe 4 which is preferably thin-walled so as to be inexpensive and light in weight. One end of the tube projects from the end of the pole opposite the butt and has connected thereto a spray head A. The tube 4 may be mounted in the casing or pole 1 in any suitable manner as by blocks 6.

A valved fitting B is mounted, preferably on the exterior of the pole, for connecting the tube 4 to a liquid supply, for example to a hose C which leads from a pump and liquid tank (not shown). As shown, the wall of the bamboo pole is formed with an opening 7 through which the lower end of the tube 4 projects, and the valved fitting includes a casing having a passage 8 coupled to the end of the tube 4. A diametrically opposite passage 9 is provided in the valve casing for connection to the hose C. Within the casing is a rotatable plug or valve 10 having a transverse passage 11 for establishing communication between the hose C and the tube 4.

The plug or valve 10 is rotated by a handle 12. Preferably the valve casing also has a drain passage 13 disposed at right angles to the passages 8 and 9, and the valve plug 10 has a drain port 14. It will thus be seen that the valve fitting B includes a three-way valve by which selectively the tube 4 may be placed in communication with the liquid supply as shown in Figure 4, or upon rotation of the plug 10 the tube 4 may be placed in communication with the drain passage 13.

It is desirable that a drain tube or pipe 15 be arranged in the casing 1 with one end connected to the drain passage 13 and the other end leading outwardly through the pole 1 adjacent the butt as at 16.

In use of the spray gun, a single operator may easily carry the gun and erect it with its butt end set on the ground or other support and the spray head A disposed above the ground, as shown in Figure 1. The hose C is connected to the valved fitting, and by simple rotation of the valve plug 10 by the handle 12, a stream of liquid may be projected from the spray head into a tree or against another article which it is desired to spray. Due to the elevation of the spray head in operation of the spray gun, the stream may be projected into the tops of tall trees, for example trees seventy-five or eighty feet in height. After the spraying operation, the valve plug 10 may be rotated to drain the tube 4 through the port 14, passage 11, and drain tube 15.

In accordance with the invention the valved fitting B is located on the pole 1 exteriorly thereof at a distance from the butt end of the pole to permit convenient manipulation of the valve handle by the operator standing erect on the ground and holding the pole in approximately vertical position as shown in Figure 1.

To facilitate distribution of the spraying liquid into the lower portion of the trees, the spray head is provided with means for diffusing the stream into a diffused or fan-shaped spray so that upon slight inclination of the pole, the spray may be directed into the lower portions of a tree as shown by dot and dash lines in Figure 1. As shown, the spray head A includes a body 17 having an outlet passage 18 in approximate alinement with the tube 4, and a stream deflector 19 is mounted on the body 17. This stream deflector is shown as including a resilient strip, preferably of spring metal, which is smooth, transversely flat, of a width slightly greater than the diameter of the outlet 18, and has one end firmly secured to the body 17 closely adjacent the outlet 18 at one side thereof. One end of the strip 19 may be riveted or otherwise secured to a bolt 20 and slipped edgewise into a recess 21 in the body 17. Preferably the free end of the strip has its side edges curvedly converging as at 190.

Normally the deflector strip 19 is wholly disposed at one side of the outlet 18 as shown by solid lines in Figure 5, but means is provided for flexing the strip transversely of and over the outlet as shown by dotted lines in Figure 5 so as to deflect the stream of liquid and diffuse it into a fan-shaped spray as indicated by dot and dash lines at D.

For so flexing the strip, we may provide a pusher 22 pivotally mounted at 23 on the body 17 at the side of the strip 19 opposite the outlet with its free end to slidably engage the strip. For actuating the pusher we may utilize a flexible wire or other connector 24, one end of which is connected as by a set screw 25 to the pusher and the other end of which is connected to an operating lever 26 pivoted at 27 on a bracket plate 28 secured on the exterior of the pole 1 adjacent the valved fitting B. The intermediate portions of the wire 24 are slidable through a guide tube 29 which may conveniently be mounted within the pole 1 alongside the tube 4 and have its upper end project into proximity to the body 17 of the spray head. The bracket plate 28 is shown as secured to the pole by bolts 29 passing through a slit 30 in the wall of the pole and a clamping plate 31 abutting the inner walls of the pole. With this construction, it will be observed that the strip 19 may be flexed simply by oscillating the lever 26 as indicated by solid and dot and dash lines in Figure 4. Flexing of the strip may be limited by an adjustable stop screw 32 on the clamping plate 28 to be abutted by the lever 26 at the limit of flexing movement of the strip 19.

With this construction the strip 19 may be flexed at the will of the operator to deflect and diffuse the stream of liquid into a fan-shaped spray, and in one continuous operation the top of a tree may be sprayed with the stream S and the lower portions of the tree may be sprayed with a diffused spray D, as shown in Figure 1. The size or spread of the spray and the angle of deflection of the stream may be varied by proper adjustment of the lever 26. Due to the relative location of the deflector strip 19 and the outlet 18 and the smooth surface of the strip, there is a minimum of obstruction to flow of liquid and a smooth uniform flow free from spurting is ensured. The stream emerging from the outlet 18 follows the continuously curved surface of the deflector strip instead of impacting upon the strip as is common in many stream deflectors of the prior art, and the converging curved edges 190 causes the stream to leave the deflector in a thin fan-shaped spray. Due to the thin edges of the deflector, the liquid freely clears itself of the edges of the deflector so that the liquid will not flow backwardly along the edges of the deflector and down the pole. Obviously this is an important factor because not only is the liquid frequently of poisonous nature, but drippage of the liquid down the pole would be unpleasant to the operator and also would result in loss or waste of the liquid.

To accelerate the flow of liquid to the nozzle and ensure flow of the liquid without surging, spurting or pulsation of the stream, we may provide a fitting E which is connected in the liquid supply conduit. As shown, this fitting includes a casing having a chamber of greater cross-sectional area than the tube 4 with an inlet 35 at one end connected to the tubing 4, and an outlet 36 at its other end to which is connected the spray head A. The outlet and inlet are coaxial with the tube 4, and between the inlet and outlet, coaxial therewith and spaced from both thereof and the walls of the casing, is a hollow frusto-conical element 37 the larger end of which is disposed adjacent the inlet. This member is shown as supported in the casing by webs 38. The end of the casing opposite the inlet forms an air dome 39. In operation, the liquid stream rising from the pipe 4 is split into two portions, one portion passing into the fitting E outside of the member 37 and the other portion passing directly through the member 37. The latter portion is accelerated and picks up with an injector action the liquid adjacent the outlet 36 so as to cause a rapid flow of the liquid through the outlet 18 of the spray head. The liquid entering the fitting is cushioned by the air in the dome 39, and accordingly a rapid, smooth and uniform flow of liquid, free from spurting, surging or pulsation, is ensured.

To close the openings in the bamboo pole around the valved fitting, the pole may be wrapped with tape or other suitable material 40. Also, to reenforce the pole against splitting, it may be wrapped at points along its length by suitable material such as cord or wire 41.

While we have shown and described the invention as embodied in certain details of structure, it will be understood that this is primarily for illustrating the principles of the invention and that many modifications and changes may be made in the details of construction without departing from the spirit or scope of the invention.

Having thus described our invention, what we claim is:

1. A spray gun comprising a long tubular casing having a butt at one end to set upon the ground or like support, a tube supported within and extending lengthwise of said casing and projecting from the other end thereof, a spray head connected to said end of the tube, a valved fitting for connecting said tube to a liquid supply and for controlling flow of liquid to said spray head, said valved fitting being mounted on said casing and spaced from said butt a distance for convenient operation by an operator standing erect on the ground and supporting said casing in approximately vertical position, said spray head including relatively movable cooperating parts for projecting selectively a stream and a diffused spray, and means operable from a point adjacent said valved fitting for causing relative movement of said parts to permit in one continuous operation the projection of a stream of liquid into the high points of a tree and a diffused spray into the lower portions of the tree.

2. A spray gun comprising a long tubular casing having a butt at one end to set upon the ground or like support, a tube supported within and extending lengthwise of said casing and projecting from the other end thereof, a spray head connected to said end of the tube, a valved fitting for connecting said tube to a liquid supply and for controlling flow of liquid to said spray head, said valved fitting being mounted on said casing and spaced from said butt a distance for convenient operation by an operator standing erect on the ground and supporting said casing in approximately vertical position, said spray head having an outlet and a resilient strip with one end connected to said head closely adjacent said outlet, said strip being normally wholly disposed at one side of said outlet, and a device for flexing said strip transversely of and over said outlet to deflect the stream of liquid therefrom.

3. A spray gun comprising a long tubular casing having a butt at one end to set upon the ground or like support, a tube supported within and extending lengthwise of said casing and projecting from the other end thereof, a spray head connected to said end of the tube, a valved fitting for connecting said tube to a liquid supply and for controlling flow of liquid to said spray head, said valved fitting being mounted on said casing and spaced from said butt a distance for convenient operation by an operator standing erect on the ground and supporting said casing in approximately vertical position, said spray head having an outlet and a resilient strip with one end connected to said head closely adjacent said outlet, said strip being normally wholly disposed at one side of said outlet, a device for flexing said strip transversely of and over said outlet to deflect the stream of liquid therefrom, an operating lever mounted exteriorly of said casing adjacent said valved fitting, and an operative connection between said lever and said device.

4. A spray head including a body having an outlet, a resilient strip secured at one end to said body closely adjacent one side of said outlet and normally wholly disposed at said side of the outlet, a pusher pivotally mounted at one end on said body at the side of said strip opposite said outlet and having its other end adapted to slidably engage said strip, and means for swinging said pusher to flex said strip transversely of and over said outlet.

5. In a spray gun, a long conduit to be connected at one end to a liquid supply and having a spray head at its other end, said conduit including a tube and a fitting having a chamber of greater cross-sectional area than said tube and formed with an inlet and outlet coaxial with the conduit, and a hollow frusto-conical element within said chamber coaxial with and spaced from the walls thereof and both of said inlet and said outlet with its larger end adjacent said inlet.

6. In a spray gun, a long conduit to be connected at one end to a liquid supply and having a spray head at its other end, said conduit including a tube and a fitting having a chamber of greater cross-sectional area than said tube and formed with an inlet and outlet coaxial with the conduit, and an air dome for cushioning the flow of liquid into said fitting.

7. In a spray gun, a long conduit to be connected at one end to a liquid supply and having a spray head at its other end, said conduit including a tube and a fitting having a chamber of greater cross-sectional area than said tube and formed with an inlet and outlet coaxial with the conduit, a hollow frusto-conical element within said chamber coaxial with and spaced from the walls thereof and both of said inlet and said outlet with its larger end adjacent said inlet, and an air dome for cushioning the flow of liquid into said fitting.

LOUIS G. DAPERO.
PETER C. DAPERO.